United States Patent [19]
Raj et al.

[11] Patent Number: 4,890,850
[45] Date of Patent: Jan. 2, 1990

[54] TAPERED FERROFLUID SEAL

[75] Inventors: Kuldip Raj, Merrimack; Ronald Moskowitz, Hollis; Frank Bloom, Windham, all of N.H.

[73] Assignee: Ferrofluidics Corporation, Nashua, N.H.

[21] Appl. No.: 182,510

[22] Filed: Apr. 18, 1988

[51] Int. Cl.[4] .......................... F16J 15/40; F16J 15/54
[52] U.S. Cl. ........................................... 277/80; 277/135
[58] Field of Search .................................. 277/1, 80, 135

[56] References Cited
U.S. PATENT DOCUMENTS

| | | | |
|---|---|---|---|
| 2,557,140 | 6/1951 | Razdowitz | 277/80 |
| 4,171,818 | 10/1979 | Moskowitz et al. | 277/80 |
| 4,357,021 | 11/1982 | Raj et al. | 277/80 X |
| 4,531,846 | 7/1985 | Raj | 277/80 X |
| 4,565,379 | 1/1986 | Ballhaus | 277/80 X |
| 4,630,943 | 12/1986 | Stahl et al. | 277/80 X |
| 4,694,213 | 9/1987 | Gowda et al. | 277/80 X |

FOREIGN PATENT DOCUMENTS

| | | | |
|---|---|---|---|
| 55-107163 | 8/1980 | Japan | 277/80 |
| 60-91066 | 5/1985 | Japan | 277/80 |
| 651160 | 3/1979 | U.S.S.R. | 277/80 |
| 773353 | 10/1980 | U.S.S.R. | 277/80 |
| 817352 | 3/1981 | U.S.S.R. | 277/80 |

OTHER PUBLICATIONS

"Magnetic-Fluid Seals", *Machine Design* for Mar. 28, 1968, pp. 145–149.

*Primary Examiner*—Robert S. Ward
*Attorney, Agent, or Firm*—Wolf, Greenfield & Sacks

[57] ABSTRACT

A ferrofluid seal wherin the amount of ferrofluid which may be used is increased by tapering the gap in which the ferrofluid is retained from one end of the gap to the other. One side of this gap is the magnet and, where used, pole pieces used to generate the magnetic field retaining the sealing ferrofluid, and the other side is a wall forming the opening to be sealed. The tapering of the gap width may be achieved by tapering either side forming the gap or by tapering both sides. The taper is preferably uniform from one end of the gap to the other.

20 Claims, 1 Drawing Sheet

TAPERED FERROFLUID SEAL

FIELD OF THE INVENTION

This invention relates to seals between a rotating and stationary member and more particularly to ferrofluid seals between a shaft and housing which rotate relative to each other.

BACKGROUND OF THE INVENTION

Ferrofluid exclusion seals find application in products such as computer disk drive assemblies where it is necessary to prevent contaminants from passing through the gap between two members which are being rotated relative to each other. For example, in disk drive assemblies, it is necessary to isolate the disk cavity to prevent contaminants from the drive motor and bearings and from the external environment from reaching the cavity along the disk drive shaft.

Prior art patents describing such seals include U.S. Pat. No. 4,357,021 issued to Raj et al on Nov. 2, 1982, and U.S. Pat. No. 4,694,213, issued to Gowda et al on Sept. 15, 1987. Both of these patents show ferrofluid seals wherein the ferrofluid is retained in a gap formed on one side by a magnet and at least one pole piece, and on the other side by a spindle or shaft, and wherein, for various reasons, the gap tapers in the area adjacent all or a portion of one of the pole pieces. This is typically accomplished by chamfering the pole piece. The magnet may be recessed from the pole piece. However, with the trend toward miniaturization of equipment such as disk drives, such equipment has become thinner and thinner, thereby severely limiting the axial space available for ferrofluid seals and therefore requiring designs with very small axial length or thickness. In some such applications, the available axial length may be less than 0.050 inches. However, as with most fluids, ferrofluid evaporates with time. Thus, as the axial width of the ferrofluid seal decreases, decreasing the space in the seal available for ferrofluid, there may be a corresponding decrease in the useful life of the seal. A need therefore exists for a relatively simple technique for increasing the amount of ferrofluid available in seals having a short axial length, so that the useful life of the seal is at least as large as that of other components in the disk drive or other equipment in which the seal is utilized.

Further, in an effort to maximize the ferrofluid in the gap, the fluid frequently fills the entire gap, resulting in a bulge above the level of the pole piece, which may result in ferrofluid splash in operation. Ferrofluid expansion due to temperature changes may also result in ferrofluid outside the magnetic field region and thus in splash. It would therefore be desirable if a means could be provided to permit sufficient ferrofluid to be used in such small-sized applications without requiring that the ferrofluid fill the seal gap to a point where splash or spillover may occur.

Another problem with many existing seals is that the uniform width of the gap results in very sharp changes in the magnetic field at the gap edges. Since the magnetic particles in the ferrofluid tend to migrate to the areas of high magnetic field, these changes result in separation of magnetic particles in the ferrofluid which adversely affects the effectiveness of the seal. The high gradients, and in particular the separation caused thereby, cause the ferrofluid properties to change with time and normally result in a progressive decrease in static pressure capacity of the seal. A ferrofluid seal design which reduces or minimizes such separation is therefore desirable.

A final problem with existing ferrofluid seals of the type described in the prior patents is that it is frequently difficult to form a desired taper on a pole piece which is very thin; for example, a pole piece having a width in the range of 0.03 inches.

Thus, as the need arises for ferrofluid seals having smaller axial widths, improvements in such seals are required (a) to permit such seals to be more easily manufactured; (b) to increase the amount of ferrofluid in such a seal for a given seal width, thus increasing the seal life; (c) to permit the ferrofluid level in the gap to be low enough so as to avoid bulge and overflow, thereby eliminating splash and other loss of ferrofluid; and (d) to make the magnetic field gradient more uniform so as to minimize separation in the ferrofluid, thus eliminating decreases in static pressure capacity with time.

SUMMARY OF THE INVENTION

In accordance with the above, this invention provides a ferrofluid seal for the gap between the walls of a shaft and a housing which are rotated relative to each other. The seal may include an annular magnet which is mounted to one of the walls and ferrofluid retained by the magnet in the gap between the magnet and the other wall. The amount of ferrofluid which may be used in a gap of such seal of given axial width is increased by having the width of the gap tapering from one end of the gap to the other. The tapering of the gap may be achieved by having the side of the magnet facing the gap tapering uniformly from one end of the gap to the other, by having the other wall forming the gap tapering uniformly from one end of the gap to the other, or by having both the magnet and the other wall tapering toward each other at one end of the gap and away from each other at the other end. Preferably, the magnet is mounted to the housing. In this case, the wall having the tapered surface is that formed by the shaft. The magnet may be radially polarized or may be axially polarized. An axially polarized magnet may have a pole piece adjacent either one pole side of the magnet or both pole sides of the magnet, the pole piece of pieces being mounted to the same gap wall as the magnet. Where pole pieces are employed, ferrofluid is retained in the gap between both the magnet and pole piece or pieces on one side and the other wall on the other side, the gap formed by both the magnet and pole pieces tapering uniformly from one end of the gap to the other. Where one side of the gap is formed of an axially polarized magnet and one or more pole pieces, that side of the gap, including both the pole pieces and the magnet, may taper uniformly from one end of the gap to the other. For a radially polarized magnet, or for an axially polarized magnet which has only a single pole piece, means may be provided for permitting a bearing to serve as part of the magnetic circuit for the magnet.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
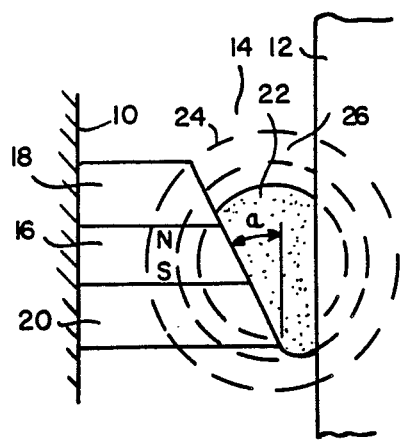
FIG. 1 is a sectional view of a ferrofluid seal utilizing the teachings of this invention.

Referring first to FIG. 1, a ferrofluid seal is shown between a housing 10 and a shaft 12. The shaft and housing are adapted to be rotated relative to each other (either one or both of these elements being rotatable, generally at high speed). The shaft may, for example, be the drive spindle of a computer disk drive. A cylindrical opening formed in housing 10 has a larger inner diameter than the outer diameter of shaft 12 so that there is a gap 14 between the shaft and housing. In order to prevent contaminants from such sources as the external environment or the disk drive motor and bearings from reaching sensitive components such as the computer disks through gap 14, a ferrofluid seal is provided to isolate the sensitive component from the contaminant sources. In FIG. 1, this seal is formed by an axially polarized, permanent magnet 16, an upper pole piece 18, a lower pole piece 20, and a quantity of ferrofluid 22 retained in the seal gap 26 between magnet 16 and pole pieces 18 and 20 on one side and shaft 12 on the other side. Ferrofluid 22 may, for example, be oil-based with a very low vapor pressure. Oil-based ferrofluids synthesized with synthetic esters, hydrocarbons, poly-olefins, fluorocarbons, polyphenyl ethers and silicones are suitable. The saturation magnetization values of these fluids may range from 50 to 300 Gauss and viscosities from 10 to 1000 Cp at 27°. These ferrofluids may be electrically conducting or nonconducting.

The permanent magnet 16 may, for example, be one ranging in energy product from $1 \times 10^6$ to $30 \times 10^6$ Gauss-Oersted, depending on the pressure capacity required for the seal. Examples of magnets suitable for use in this application include Alnicos, rigid plastic ferrites, plastic or metallic Sm-Co, or plastic or metallic Nd-Fe-B magnets. The magnet and pole pieces are shown as mounted to housing 10 by suitable means such as adhesive bonding. The magnet and pole pieces produce a magnetic field 24 which extends into gap 14 and is closed through shaft 12 which is formed of a magnetically permeable material. As is well known in the art, and as is discussed in greater detail in the previously mentioned patents, the magnetic field 24 is strong enough to retain the ferrofluid in the gap 26. The magnet and pole pieces are sealed together by a suitable ferrofluid impermeable adhesive so as to assure that ferrofluid 22 does not seep from gap 26 between these components.

The ferrofluid seal as described so far is conventional. It should be understood that magnet 16 and pole pieces 18 and 20 are annular as in the prior art, and that the ferrofluid 22 also extends around the full 360° extent of gap 26. Since details of the computer disk drive or other equipment in which the ferrofluid seal is being utilized, all aspects of the ferrofluid seal except the cross-section thereof as shown in the figures, and other details, are conventional and are, for example, shown and discussed in the prior art, including, to some extent, the patents previously mentioned, such details will not be repeated here, and the following discussion will relate primarily to the novel aspects of this invention.

As previously indicated, one problem with the prior art ferrofluid seals, particularly when operating in miniaturized equipment where axial space available for the seal, and thus the axial length of gap 26, are quite small, is that it is difficult to provide a sufficient quantity of ferrofluid 22 in the gap to achieve a desired seal life. For example, for small systems, the length of the gap from the top of the pole piece 18 to the bottom of pole piece 20 may be in the range of 0.040–0.090 inches and the width of the gap at its narrowest point may be in the range of 0.002 to 0.008 inches. As shown in FIG. 1, this problem is overcome by providing that the side of gap 26 formed by magnet 16 and pole pieces 18 and 20 taper uniformly from one end of gap 26 to the other. The taper angle $\alpha$ may vary with application from 5° to 60° However, for most applications, the angle $\alpha$ will be in the range of from 10° to 25°, 15° being a typical taper angle.

Tapering a side of the gap 26 provides a number of substantial advantages. First, the taper permits the use of a relatively small gap spacing, and thus a higher flux density, at one end of gap 26, providing the high magnetic force necessary to retain the ferrofluid 22 in gap 26, while still permitting a wide enough gap 26 so that the quantity of ferrofluid is adequate to achieve the desired seal life. The tapered widening of gap 26 also permits the desired quantity of ferrofluid in the gap without requiring that the gap 26 be filled with fluid to its upper edge. This permits the ferrofluid in gap 26 to expand with temperature increases without causing the fluid to overflow the control of the magnetic field and avoids a bulge which could cause splashing of ferrofluid during rotation. Also, the tapered gap 26 provides a low magnetic flux gradient, the flux density being highest where the gap is smallest and decreasing more or less uniformly as the gap widens. This change in flux gradient avoids the sharp changes in flux gradient which occur with the existing straight wall designs and may provide a lower value of flux gradient than existing chamfered pole piece designs. As a result, there is less tendency for the magnetic particles to separate and congregate with the design of this invention, resulting in improved terminal static pressure capacity. Since the fluid properties are not prone to change with time as a result of the flux gradient, the static pressure capacity of ferrofluid seals employing this invention also tend to remain fairly constant or even increase with time rather than decreasing with time as in the prior art.

Finally, it is easier to machine or otherwise form the taper on the somewhat thicker magnet/pole piece combination than on the single very thin pole piece, making the seal easier to manufacture.

Figure 2:
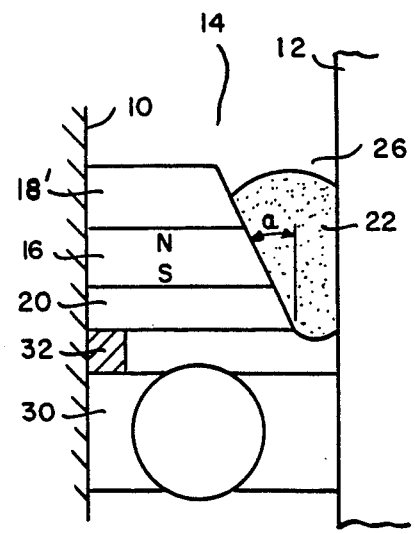
FIG. 2 is a sectional view of a modified form of the ferrofluid seal shown in FIG. 1.

FIG. 2 shows an alternative embodiment of the invention which differs from the embodiment shown in FIG. 1 in that the pole pieces 18 and 20 are of unequal size, pole piece 18 being larger than pole piece 20. FIG. 2 also shows a bearing 30 which is typically formed of a magnetically permeable material. Since the seal shown in FIG. 2 has pole pieces both above and below the magnet, flux lines passing through bearing 30 would diffuse and weaken the magnetic field. Therefore, a spacer 32 of a material which is not magnetically permeable is provided between pole piece 20 and bearing 30 so that the bearing does not become part of the flux path.

Figure 3:
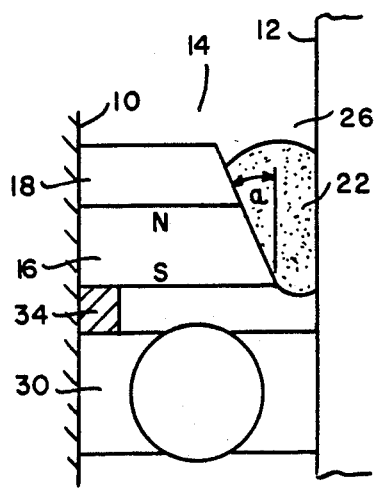
FIG. 3 is a sectional view of an alternative embodiment of ferrofluid seal utilizing the teachings of this invention.

Conversely, in FIG. 3, magnet 16 is provided with only a single pole piece 18. In this configuration, it is therefore desirable that bearing 30 be part of the magnetic flux path since this enhances the flux concentration in the gap 26 and therefore enhances the seal pressure capacity. Therefore, for this embodiment of the invention, the spacer 34 is formed of a magnetically permeable material permitting bearing 30 to complete the flux path. For both the embodiment shown in FIG. 2 and that shown in FIG. 3, the side of gap 26 formed by the magnet and pole piece or pole pieces tapers uniformly at the angle α from one end of the gap to the other.

Figure 4:
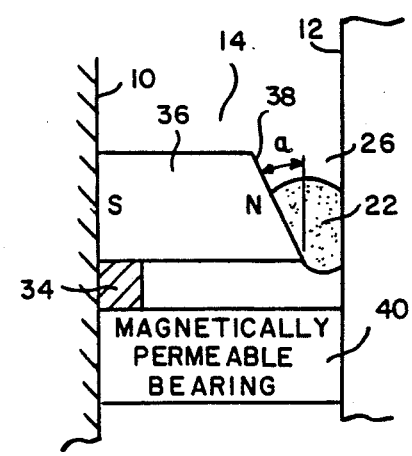
FIG. 4 is a sectional view of another embodiment of ferrofluid seal utilizing the teachings of this invention.

FIG. 4 shows still another embodiment of the invention wherein the magnet 36 is radially polarized rather than axially polarized. The magnet 36 may be of a metallic material and electrically conducting, or may be formed of a plastic and be electrically nonconducting. In the alternative, an electrically nonconducting magnet may be utilized with a conductive coating such as silver paint to render it conducting. As with the prior embodiments of the invention, the magnet 36 has a tapered face 38 adjacent gap 26, the taper angle α being in the ranges previously discussed. The magnet 36 is separated from a bearing 40 of a magnetically permeable material by a shim or spacer 34 which is also formed of a magnetically permeable material. Bearing 40 may be a ball bearing such as is shown in FIGS. 2 and 3, or it may be a thrust bearing or other bearing suitable for use in computer disc drives and similar equipment. The bearing thus serves to complete the flux path, enhancing the flux density and thus the static pressure capacity of the seal. For this embodiment of the invention, and for prior embodiments, shaft 12 should be of a magnetically permeable material, thus being part of the flux path. However, for this embodiment of the invention, housing 10 may also be of a magnetically permeable material to also be part of the flux path, although this is not essential.

Figure 5:
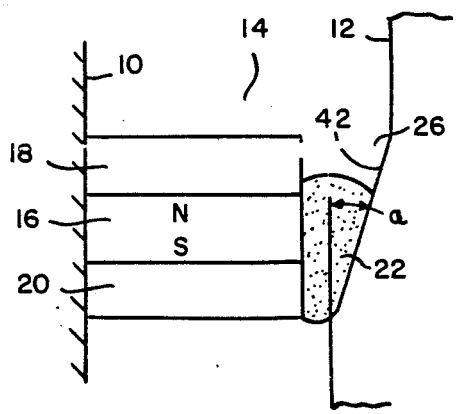
FIGS. 5 and 6 are sectional views of two additional embodiments of the invention.

FIG. 5 shows an embodiment of the invention wherein the taper of gap 26 is achieved by having a taper formed in shaft 12 in the portion 42 thereof adjacent gap 26 rather than having the taper formed in the magnet and pole pieces. The angle α for the taper of surface 42 would be the same as the taper angle α for the prior embodiments of the invention. Except for the difference in the wall of gap 26 which is tapered, this embodiment of the invention functions in the same way as the prior embodiments, and provides the same advantages. It should also be noted that while the tapered shaft wall 42 has been shown in FIG. 5 for a seal having an axially polarized magnet 16 and two pole pieces 18 and 20, a tapered shaft wall could also be used with other seal configurations such as the single axially-polarized magnet and single pole piece shown in FIG. 3, and the radially polarized magnet shown in FIG. 4.

Figure 6:
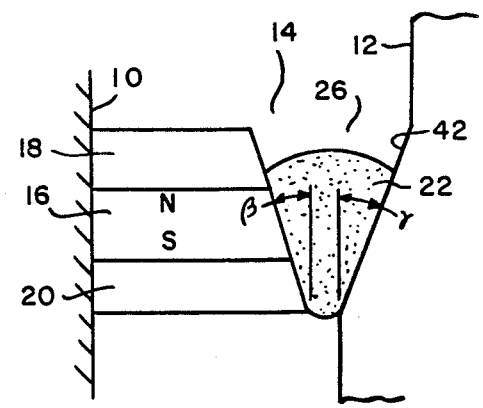

FIG. 6 shows another embodiment of the invention wherein the tapered gap 26 is formed by having both walls of gap 26 taper in opposite directions. For this embodiment of the invention, the sum of the taper angle β for the magnet/pole piece side of the gap and the taper angle γ for the shaft side of the gap should equal the angle α discussed for the prior embodiments of the invention. Thus, the sum of the angles β and γ would be in a range of 5° to 60° and preferably would be in a range of 10° to 25° The angles β and γ may be the same or may be different. Again, except for having both walls of gap 26 taper, rather than only a single wall, the embodiment of FIG. 6 functions the same as the previous embodiments and provides all of the same advantages. This embodiment of the invention may also be used with other seal configurations including the single pole piece configuration of FIG. 3 and the radially polarized magnet configuration of FIG. 4.

While in the various embodiments described above and shown in the figures, the seal has been vertically oriented with gap 26 being larger on top and smaller on the bottom, the magnetic field is strong enough to retain the ferrofluid 22 in any orientation so that shaft 12 may be vertically oriented as shown, horizontally oriented, or at any angle in between. Gap 26 may also be largest at its bottom and smallest at its top rather than the other way around as shown in the figures, although the configuration shown is currently preferred. Similarly, while axially-polarized magnet 16 has been shown as having a north pole on top with a wider gap and a south pole on the bottom with a narrower gap, there is no correlation between the polarity of the magnet and the gap, and the magnet may be polarized in either direction. Similarly, radially polarized magnet 36 may also be polarized in either direction. Also, while the taper angles in all of the embodiments have been shown as being uniform (and for the embodiments shown this is preferable both because it is easier to machine parts in this configuration and because it avoids large changes in the magnetic field), it is possible that in some applications it may be desirable for the taper angle for either one or both walls of gap 26 to vary at some point along the wall, and such a configuration is within the contemplation of the invention. Finally, while the magnet and, when used, pole piece,, have been shown as attached to housing 10 and wall 42 of shaft 12 has been tapered for some embodiments, the magnets and pole pieces could be fixed to shaft 12 and the tapered surface of the gap could, for such a configuration, be a surface of housing 10.

Thus, while the invention has been described above with respect to preferred embodiments, the foregoing and other changes in form and detail may be made therein without departing from the spirit and scope of the invention.

What is claimed is:

1. A ferrofluid seal between facing walls of a shaft and a shaft and a housing, the shaft and housing being rotated relative to each other, the seal comprising:
    an annular magnet which is mounted to one of said walls;
    means, including in part said magnet, for providing a complete magnetic flux path, at least part of said means including said magnet being spaced by a predetermined gap from the other wall to which the magnet is not mounted, the flux path passing through said gap; and
    ferrofluid retained in and substantially filling said gap;
    the width of said gap tapering in the same direction from one end of the gap to the other.

2. A seal as claimed in claim 1 wherein the side of said gap containing said magnet tapers uniformly from one end of the gap to the other.

3. A seal as claimed in claim 2 wherein the taper angle of said gap side is between 5° and 60°.

4. A seal as claimed in claim 3 wherein the taper angle of said gap side is 10° to 25°.

5. A seal as claimed in claim 1 wherein the other wall forming said gap tapers uniformly from one end of the gap to the other.

6. A seal as claimed in claim 5 wherein the magnet is mounted to the housing and the tapered wall is a wall of the shaft.

7. A seal as claimed in claim 5 wherein the taper angle of the tapered wall is between 5° and 60°.

8. A seal as claimed in claim 7 wherein the taper angle of the tapered wall is between 10° and 25°.

9. A seal as claimed in claim 5 wherein the side of said gap containing the magnet tapers uniformly from one end of the gap to the other, the taper angle of said magnet containing side being such that both the magnet containing side and the tapered wall are at their nearest point to the other on the same side of the gap.

10. A seal as claimed in claim 9 wherein the sum of the taper angles for the containing side and the tapered wall is between 5° and 60°.

11. A seal as claimed in claim 10 wherein the sum of the taper angels for the containing side and the tapered wall is between 10° and 25°.

12. A seal as claimed in claim 1 wherein said magnet is radially polarized.

13. A seal as claimed in claim 12 wherein said magnetic field path completing means includes bearing means.

14. A seal as claimed in claim 1 wherein said magnet is axially polarized; and
wherein said magnet field path completing means includes at least one pole piece adjacent a pole side of said magnet and mounted to the same wall as the magnet,
ferrofluid being retained in the gap between both the magnet and pole piece on one side and the other wall on the other side, the gap tapering in the same direction from one end of the gap to the other.

15. A seal as claimed in claim 14 wherein said magnetic field path completing means includes a second pole piece, the pole pieces being adjacent opposite poles of the magnet and mounted to the same wall as the magnet,
ferrofluid being retained in the gap between both the magnet and pole pieces on one side and the other wall on the other side, the gap tapering in the same direction from one end of the gap to the other.

16. A seal as claimed in claim 15 wherein the pole pieces are of unequal width.

17. A seal as claimed in claim 14 including means for securing the magnet and pole piece together, said means being substantially ferrofluid impermeable.

18. A seal as claimed in claim 14 wherein said magnetic field path completing means includes magnetically permeable bearing means positioned on the opposite side of the magnet from the pole piece, and a magnetically permeable spacer between the magnet and the bearing.

19. A seal as claimed in claim 14 wherein said one side of the gap tapers uniformly from one end of the gap to the other.

20. A seal as claimed in claim 19 wherein both sides of the gap taper uniformly from one end of the gap to the other, the taper angles being toward each other on one end of the gap and away from each other on the outer end of the gap.

* * * * *